US012606133B2

(12) United States Patent
Kumar et al.

(10) Patent No.: US 12,606,133 B2
(45) Date of Patent: Apr. 21, 2026

(54) VEHICLE CONTROL SYSTEM

(71) Applicant: Westinghouse Air Brake Technologies Corporation, Wilmerding, PA (US)

(72) Inventors: Ajith Kuttannair Kumar, Wilmerding, PA (US); Bret Dwayne Worden, Wilmerding, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 1597 days.

(21) Appl. No.: 16/816,662

(22) Filed: Mar. 12, 2020

(65) Prior Publication Data

US 2021/0284110 A1    Sep. 16, 2021

(51) Int. Cl.
| | |
|---|---|
| *B60T 8/17* | (2006.01) |
| *B60T 8/171* | (2006.01) |
| *B60T 8/175* | (2006.01) |
| *B60T 8/1755* | (2006.01) |
| *B60T 8/52* | (2006.01) |
| *B61C 15/08* | (2006.01) |

(52) U.S. Cl.
CPC ............ *B60T 8/1705* (2013.01); *B60T 8/171* (2013.01); *B60T 8/175* (2013.01); *B60T 8/17551* (2013.01); *B60T 8/17552* (2013.01); *B60T 8/52* (2013.01); *B61C 15/08* (2013.01); *B60T 2210/12* (2013.01)

(58) Field of Classification Search
CPC ........ B60T 8/1705; B60T 8/171; B60T 8/175; B60T 8/17551; B60T 8/17552; B60T 8/52; B60T 2210/12; B61C 15/08

USPC .......................................................... 701/20
See application file for complete search history.

(56) References Cited

U.S. PATENT DOCUMENTS

| | | | |
|---|---|---|---|
| 6,133,700 A | 10/2000 | Kumar | |
| 6,148,269 A | 11/2000 | Kumar et al. | |
| 8,371,233 B2 | 2/2013 | Kumar et al. | |
| 8,645,011 B2 | 2/2014 | Schaffler | |
| 8,677,909 B2 | 3/2014 | Kumar et al. | |
| 2017/0334414 A1 * | 11/2017 | Kumar ................... | B60T 8/175 |
| 2019/0263413 A1 * | 8/2019 | Hancock .............. | B60W 30/02 |

* cited by examiner

*Primary Examiner* — Jacob S. Scott
*Assistant Examiner* — Michael E Butler
(74) *Attorney, Agent, or Firm* — K&L Gates LLP

(57) ABSTRACT

A vehicle control system includes a controller comprising one or more processors. The controller is configured to determine a respective force exerted on a route segment by a first wheel of a plurality of wheels of a vehicle and obtain a respective available adhesion value for the first wheel at an interface with the route segment. The controller is configured to determine a respective effective adhesion value to utilize for driving rotation of the first wheel. The effective adhesion value is within a designated wheelslip margin relative to the available adhesion value for the first wheel without exceeding the available adhesion value. The controller is further configured to assign a torque setting to rotate the first wheel based at least in part on the respective force exerted on the route segment by the first wheel and the effective adhesion value for the first wheel.

11 Claims, 3 Drawing Sheets

| Wheel | Position 302 | Available Adhesion 304 | Designated Adhesion Utilization 306 | Effective Adhesion 308 | Weight (lbs) 310 | Adhesion-Limited TE 312 |
|-------|----------|--------------------|--------------------------------|--------------------|--------------|-------------------------|
| 1 | Front | 0.30 | 95% | 0.28 | 68,000 | 19,040 N |
| 2 | Middle | 0.34 | 95% | 0.32 | 70,000 | 22,400 N |
| 3 | Rear | 0.40 | 95% | 0.38 | 73,000 | 27,740 N |

400 —

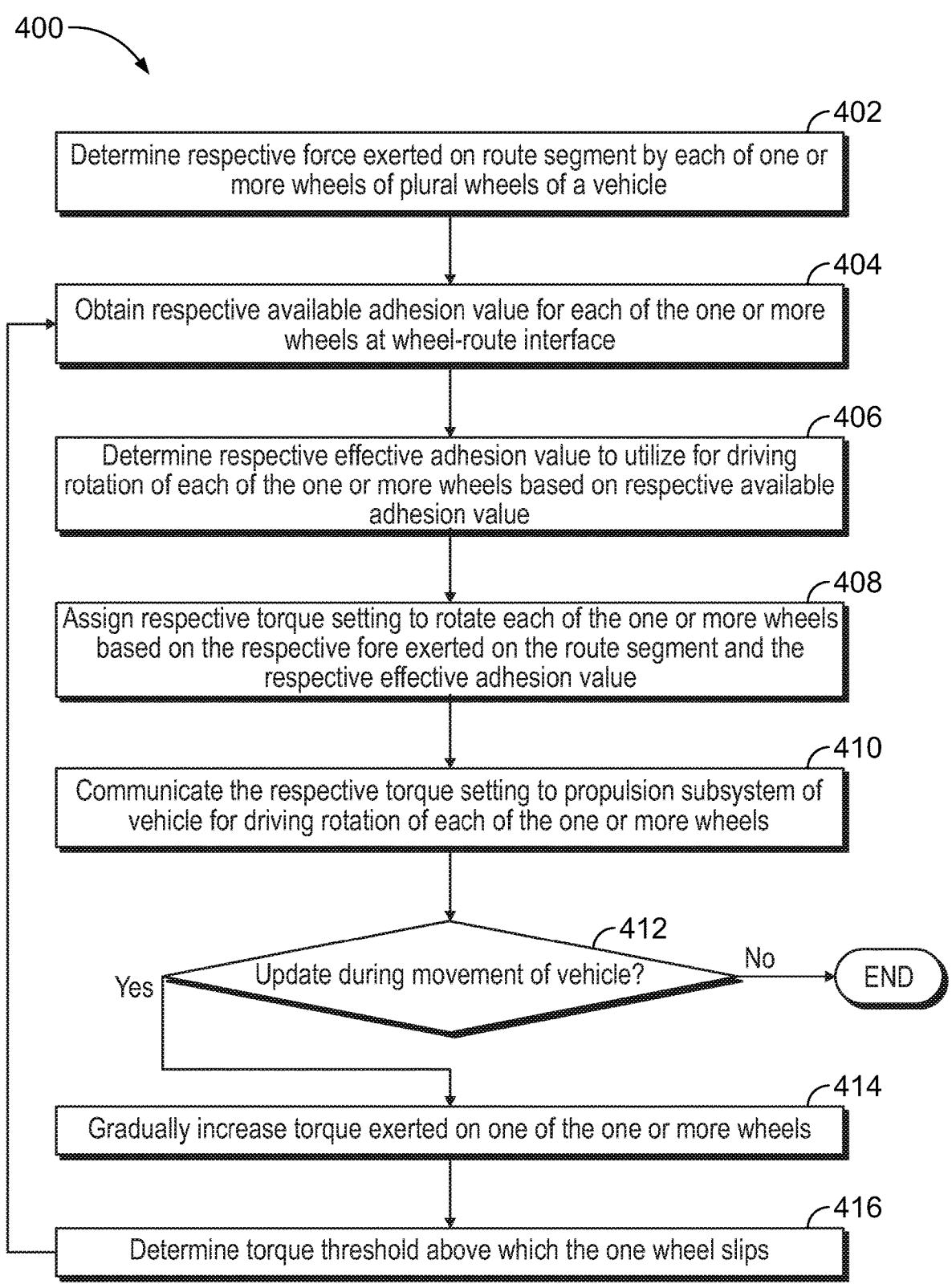

402

Determine respective force exerted on route segment by each of one or more wheels of plural wheels of a vehicle

404

Obtain respective available adhesion value for each of the one or more wheels at wheel-route interface

406

Determine respective effective adhesion value to utilize for driving rotation of each of the one or more wheels based on respective available adhesion value

408

Assign respective torque setting to rotate each of the one or more wheels based on the respective fore exerted on the route segment and the respective effective adhesion value

410

Communicate the respective torque setting to propulsion subsystem of vehicle for driving rotation of each of the one or more wheels

412

Update during movement of vehicle?

Yes          No          END

414

Gradually increase torque exerted on one of the one or more wheels

416

Determine torque threshold above which the one wheel slips

FIG. 4

VEHICLE CONTROL SYSTEM

BACKGROUND

Technical Field

Embodiments of the present disclosure relate to controlling the propulsion of vehicles along a route.

Discussion of Art

The propulsion of land-based vehicles along a route is dependent on adhesion at an interface between the route and the moving components (e.g., wheels) of the vehicles that engage the route. For example, if a torque exerted on a wheel of the vehicle exceeds the available friction at the wheel-route interface, the wheel will slip and spin relative to the contact surface of the route. Wheels in a slip state can be undesirable for several reasons. Wheel slip reduces the total tractive effort or output provided by the vehicle because the slipping wheel does not contribute to the propulsion of the vehicle. Furthermore, the rubbing between the wheel and the route surface can damage and/or degrade one or both of the components, such as by producing wheel surface damage. The slipping wheel may also cause vibration that interferes with operations of other components of the vehicle and/or comfort of passengers on the vehicle.

Some vehicle control systems command the respective propulsion components onboard the vehicle to promote rotation of the wheels at the same or similar torque settings and/or to provide a force at the contact surface (tractive effort) which is equal between wheels or axles. These control methods do not account for the individual adhesion capabilities of the wheels, which may differ along the length of the vehicle and along different segments of the route. For example, different wheels of the same vehicle may experience different amounts of adhesion or friction at the wheel-route interface. As a result of this variation in adhesion capability, a uniform torque setting or tractive effort commanded to the wheels may cause one or more of the wheels with limited adhesion to slip. Some vehicle control systems compensate for the risk of wheel slip by conservatively assigning low torque settings that are well below an expected traction limit to ensure that no wheel experiences slip. However, the conservatively low torque settings limit the performance of the vehicle by, for example, limiting acceleration, limiting travel speed, limiting the amount of cargo or load conveyed by the vehicle, increasing travel time, and/or requiring additional or larger propulsion-generating equipment relative to controlling the vehicle without conservatively limiting the torque settings. Some other control systems attempt to provide equal tractive effort or equal torque to the wheels and dynamically reduce the effort on the wheels which experience excessive slip. This approach may lead to vibration or jerk which can result in harmful component stress, reduced ride quality, and reduced aggregate vehicle pulling capability.

It may be desirable to have a system and method that differs from those that are currently available.

BRIEF DESCRIPTION

In one or more embodiments, a vehicle control system is provided that includes a controller comprising one or more processors. The controller is configured to determine a respective force exerted on a route segment by a first wheel of a plurality of wheels of a vehicle and obtain a respective available adhesion value for the first wheel at an interface with the route segment. The controller is configured to determine a respective effective adhesion value to utilize for driving rotation of the first wheel. The effective adhesion value is within a designated wheelslip margin relative to the available adhesion value for the first wheel without exceeding the available adhesion value. The controller is further configured to assign a torque setting to rotate the first wheel based at least in part on the respective force exerted on the route segment by the first wheel and the effective adhesion value for the first wheel.

In one or more embodiments, a method (e.g., a vehicle control method) is provided that includes determining a respective force exerted on a route segment by a first wheel of a plurality of wheels of a vehicle and obtaining a respective available adhesion value for the first wheel at an interface with the route segment. The method also includes determining a respective effective adhesion value to utilize for driving rotation of the first wheel. The effective adhesion value that is determined is within a designated wheelslip margin relative to the available adhesion value for the first wheel without exceeding the available adhesion value. The method includes assigning a torque setting to rotate the first wheel based at least in part on the respective force exerted on the route segment by the first wheel and on the effective adhesion value for the first wheel.

In one or more embodiments, a vehicle control system is provided that includes a controller comprising one or more processors. The controller is configured to determine a respective force exerted on a route segment by each of at least two wheels of a vehicle that are spaced apart along a length of the vehicle. The controller is configured to obtain a respective available adhesion value for each of the at least two wheels at an interface between the at least two wheels and the route segment. The controller is configured to determine a respective effective adhesion value to utilize for driving each of the at least two wheels. The effective adhesion values determined by the controller in order for each of the at least two wheels to provide a same adhesion utilization. The adhesion utilization represents the effective adhesion value over the available adhesion value for the corresponding wheel. The controller is further configured to assign a respective torque setting to rotate each of the at least two wheels based at least in part on the respective forces exerted on the route segment by the at least two wheels and the respective effective adhesion values for the at least two wheels.

BRIEF DESCRIPTION OF THE DRAWINGS

The inventive subject matter may be understood from reading the following description of non-limiting embodiments, with reference to the attached drawings, wherein below:

FIG. 4 is a flow chart of a method for controlling movement of a vehicle system along a route segment according to an embodiment.

DETAILED DESCRIPTION

One or more embodiments described herein are directed to a system and method for controlling vehicle propulsion along a route. The system and method account for the adhesion capability of one or more wheels of the vehicle to determine an amount of torque to exert on the one or more wheels. For example, instead of assuming that the adhesion capability of each wheel on the vehicle is approximately equal, the system and method obtain respective available adhesion values for different corresponding wheels of the vehicle. The respective available adhesion values can be estimated by considering various factors, such as the presence of friction-modifying materials on the route and/or route cleaning. For example, sand can be selectively applied on the route and/or route cleaning can be selectively performed to modify the adhesion on the route, and the presence or absence of friction-modification techniques can be used to estimate the available adhesion. Instead of or in addition to estimating the available adhesion, the available adhesion can be determined in a closed loop process in which detection of an actual wheel slip can be used to sample the threshold wheel tractive effort or torque value which caused the wheel slip. The threshold tractive effort and/or torque value can be used to calculate the available adhesion.

Upon determining the adhesion capabilities of the wheels, the system and method can assign torque settings to the wheels according the corresponding adhesion capabilities. As a result, if a first wheel can provide more tractive effort at a given time than a second wheel of the same vehicle, then the first wheel can be supplied with more torque than the second wheel without either of the first wheel or the second wheel experiencing slip. The vehicle control system can also account for additional variables among the different wheels and wheelsets besides adhesion, such as the normal force exerted on the route per wheel (e.g., weight) and wheel diameter, and the variables can be used to assign the torque settings.

By accounting for individual adhesion capabilities and other variables of the wheels, the system and method disclosed herein can utilize more of the wheel-route adhesion that is available without increasing the risk of wheel slips relative to control systems that do not factor individual wheel adhesion capabilities. For example, at least some of the wheels can be controlled to have the same adhesion utilization, such that the wheels essentially use the same proportion of respective adhesion available, even if the adhesion that is available varies between wheels. Controlling the wheels based on adhesion utilization can result in greater total tractive effort provided by the vehicle, increased performance of the vehicle, and reduced vibration relative to not factoring individual wheel adhesion capabilities.

Figure 1:
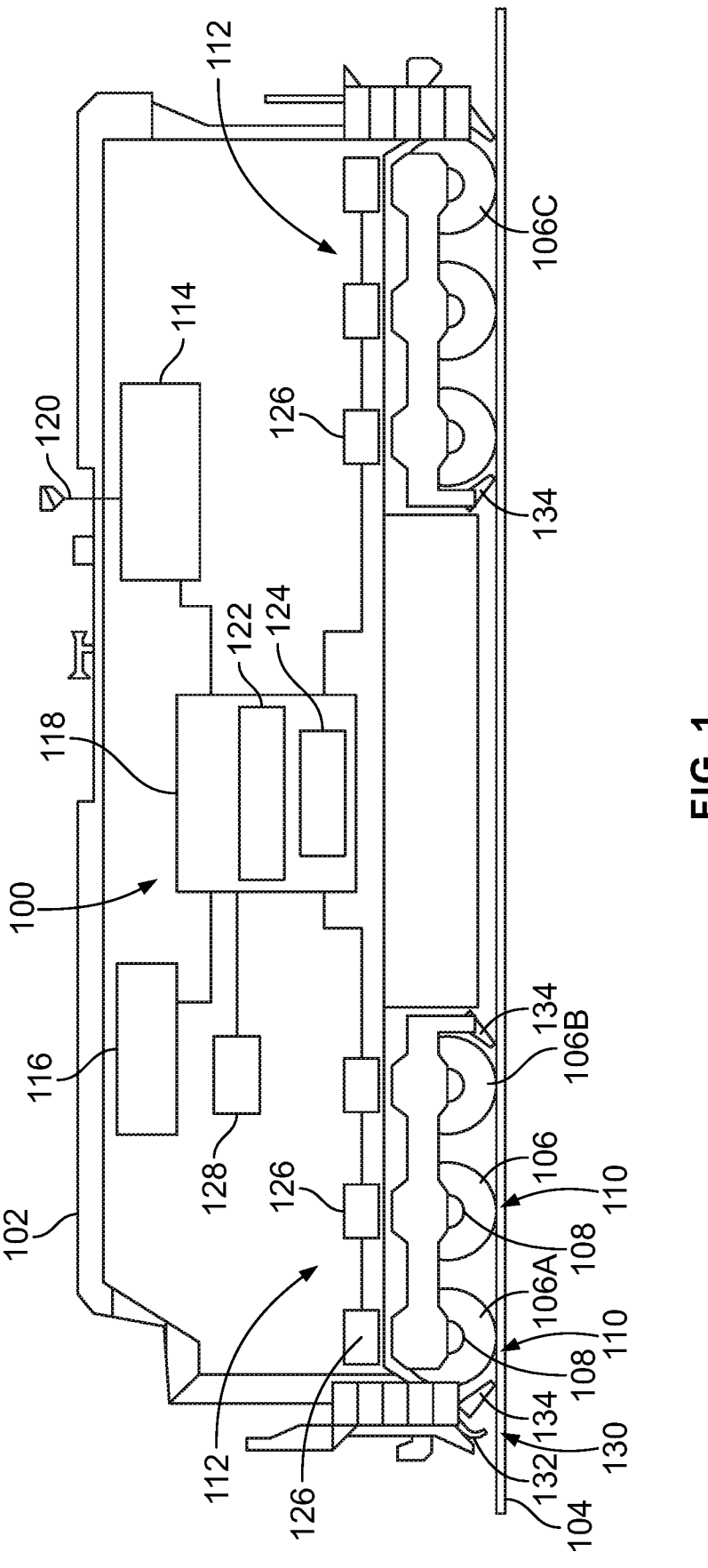
FIG. 1 is a schematic illustration of a vehicle control system disposed on a propulsion-generating vehicle according to an embodiment.

FIG. 1 is a schematic illustration of a vehicle control system 100 disposed on a propulsion-generating vehicle 102 according to an embodiment. The propulsion-generating vehicle (also referred to herein as vehicle) is land-based and travels on a route segment 104. The vehicle includes a plurality of wheels 106 that engage the route segment, and the vehicle moves along the route by exerting torque on at least some of the wheels to force the wheels to rotate. The vehicle control system assigns torque settings for rotating the wheels to control movement of the vehicle along the route, such as the speed and acceleration of the vehicle. In embodiments described herein, the vehicle control system assigns the torque settings based at least in part on individual adhesion capabilities of the wheels at the wheel-route interface.

In one example, the wheels of the vehicle are mechanically coupled to axles 108. Each axle may mechanically couple to multiple wheels that are spaced apart along a length of the axle to define a respective wheelset 110. In the illustrated embodiment, the vehicle has six wheelsets and twelve associated wheels, but the vehicle can have more or less than six wheelsets in other embodiments. In the illustrated example, the vehicle is a rail vehicle, such as a locomotive, and the route is a railroad track. In other examples, the vehicle control system can be disposed onboard another type of vehicle, such as a truck (e.g., highway semi-truck, mining truck, logging truck, or the like), an automobile, a bus, and/or the like, and the route can be a paved road, an off-road path, or the like. Although not shown in FIG. 1, the vehicle may be coupled to one or more wheeled loads, such as non-propulsion vehicles, to pull and/or push the wheeled loads along the route.

The vehicle includes a propulsion subsystem 112, a communication device 114, a user input/output (I/O) device 116, and a controller 118 disposed onboard. The controller 118 is operably connected to the propulsion subsystem, the communication device, and the user I/O device via wired and/or wireless communication pathways.

The propulsion subsystem includes components mechanically coupled to the wheelsets for exerting torque to rotate the wheels. The propulsion components include traction motors 126, one or more power sources, one or more alternators, one or more generators, and associated circuitry. The power sources can include a fuel-combustion engine, an energy storage device (e.g., batteries and/or capacitors), and/or the like. In the illustrated embodiment, a different traction motor is associated with each of the six wheelsets. In a propulsion mode of the vehicle, the motors receive electric current from the alternator and convert the electrical energy to mechanical energy that exerts torque to rotate the wheels. Because each of the wheelsets is associated with a different corresponding motor, the wheelsets can be independently controlled by receiving different amounts of torque to take advantage of the different adhesion capabilities of the wheels. In a regenerative braking mode, the motors utilize mechanical energy from the rotating wheels to generate electrical energy. The electrical energy can be supplied to an energy storage device, used to temporarily power a load, or dissipated as heat. The propulsion subsystem can also include brake components for providing braking effort to slow and stop the vehicle during a braking mode of the vehicle. The brakes may include or represent friction brakes, air brakes, and/or the like.

The communication device can represent hardware and associated circuitry that can communicate electrical signals wirelessly and/or via wired connections. For example, the communication device can represent transceiving circuitry, one or more antennas 120, modems, or the like. The transceiving circuitry may include a transceiver or separate transmitter and receiver devices. The electrical signals can form data packets that in the aggregate represent messages. The communication device can receive messages and forward the messages to the controller. Messages generated by the controller can be communicated offboard the vehicle via the communication device.

The I/O device can represent or include a workstation computer, tablet computer, handheld computer, keyboard, touchpad, display device, lever, pedal, joystick, and/or the like for enabling an operator onboard the vehicle to interact with various vehicle systems, such as to input tractive settings and brake settings. The I/O device optionally may represent multiple different devices, such as an input device (e.g. a pedal) and display device.

The controller performs at least some of the operations of the vehicle control system described herein. For example, the controller determines the weight on each wheel, the diameter of each wheel, and the adhesion capabilities of the wheels on the route. The controller then assigns torque settings for rotating the wheels based on the adhesion capabilities, weights, and wheel diameters to provide increased control over the vehicle relative to assigning torque to the wheels without factoring adhesion capability. The controller represents hardware circuitry that includes and/or is connected with one or more processors 122 (e.g., one or more microprocessors, integrated circuits, microcontrollers, field programmable gate arrays, etc.). The control system includes and/or is connected with a tangible and non-transitory computer-readable storage medium (e.g., memory) 124 disposed onboard the vehicle. For example, the memory may store programmed instructions (e.g., software) that is executed by the one or more processors to perform the operations of the controller described herein. The memory additionally or alternatively may store different information, such as a route database, a trip schedule, a trip plan that provides tractive and braking settings associated with different locations along the route, parameters of the vehicle, and/or the like.

The vehicle control system can monitor data parameters received from one or more sensors 128. The sensors may be disposed onboard the vehicle at different locations corresponding to the components associated with the data parameter that is measured or recorded by the sensors. The sensors can be communicatively coupled to the controller via a wired connection pathway. Alternatively, one or more of the sensors may be wireless connected to the controller via the communication device 120. In one example, the sensors may generate data parameters representative of torque, rotational wheel speed, vehicle speed, weight, throttle position, creep, wheel slip, and/or the like. The sensors can include force sensors, throttle position sensors, accelerometers, speed sensors, surface acoustic wave (SAW) sensors, and/or the like.

The vehicle also may include one or more route friction modifying devices 130. The route friction modifying devices 130 are selectively controllable to affect the surface of the route. The route friction modifying devices may be communicatively connected to the controller via a wired or wireless communication link that enables the controller to activate and deactivate the operation of the friction modifying devices. The friction modifying devices in the illustrated embodiment include an air jet cleaning device 132 and a friction-enhancing applicator device 134. The air jet cleaning device includes an air jet nozzle positioned to blow air on the route. The force of the air can remove small debris, such as leaves, from the route. The friction-enhancing applicator device includes a nozzle or port that emits sand and/or another compound onto the route to increase the adhesion on the route. The air jet nozzle can be located in front of the sand-emitting nozzles to prevent the air jet from blowing off the sand. The controller can selectively operate one only type of friction modifying device at a time, multiple different types of friction modifying devices at the same time, or neither friction modifying device depending on application-specific considerations and the availability of different friction-modifying devices on the vehicle. For example, the controller may concurrently operate both types of friction modifying devices such that the air jet blows loose debris off the route and the friction-enhancing applicator devices emit sand onto the cleaned route. Optionally, the vehicle may include a different type of friction-modifying device, such as brushes for mechanically sweeping debris off the route.

Figures 2, 3:
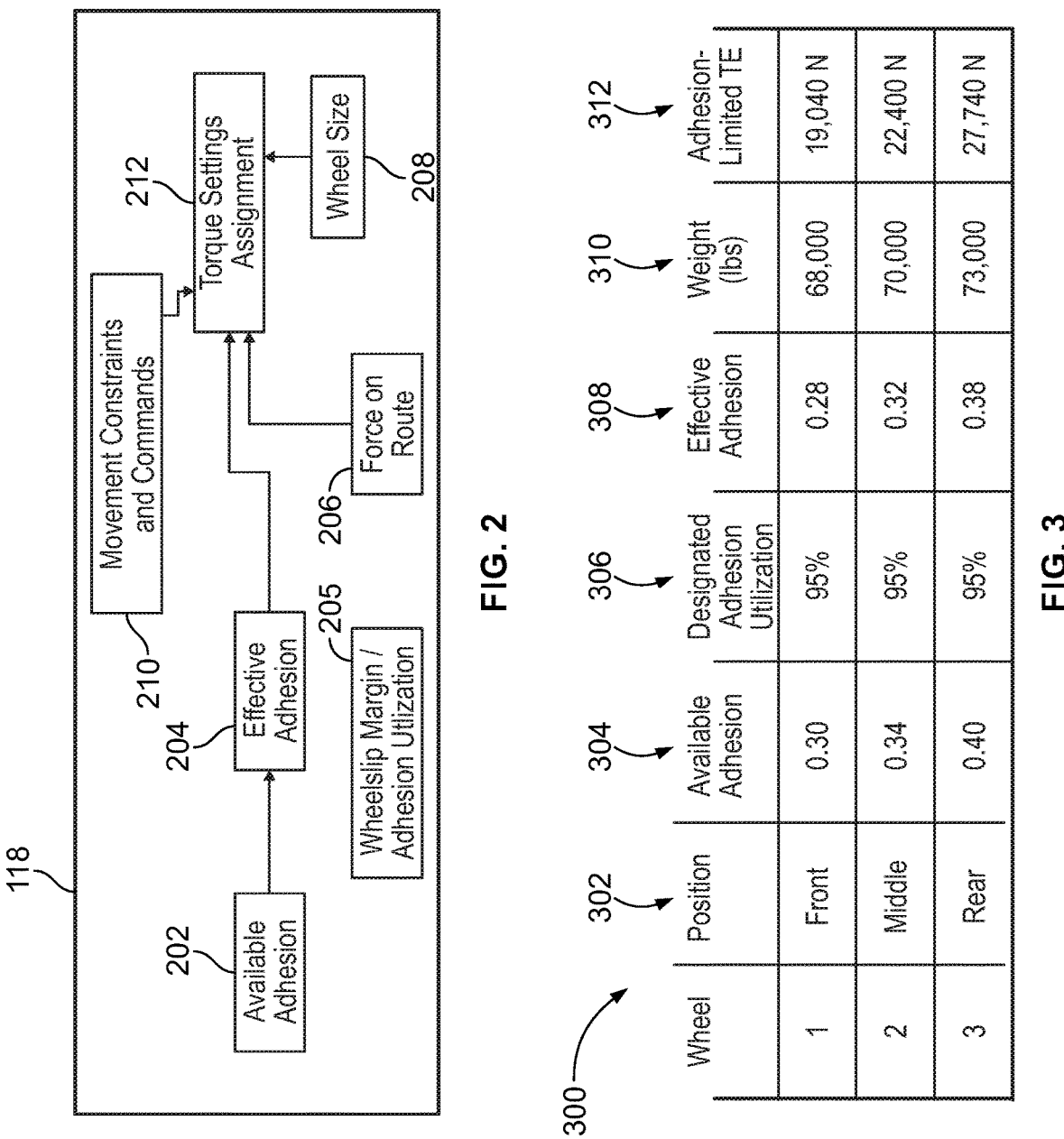
FIG. 2 is a schematic diagram of a controller of the vehicle control system according to an embodiment.
FIG. 3 is a table illustrating operations of the controller for assigning torque to three wheels of a vehicle according to one example.

FIG. 2 is a schematic diagram of the controller of the vehicle control system according to an embodiment. The diagram represents different modules or units of the controller that perform different operations for determining how to control the torque exerted on the wheels of the vehicle. The divisions between the modules is for illustrative purposes and may not be representative of different hardware. For example, the same one or more processors may perform the operations of more than one of the modules described in FIG. 2. In another example, a first set of one or more processors may perform the operations of a first group of the modules and a different set of one or more processors perform the operations of a different, second group of the modules. At least some of the operations may be controlled based on programmed instructions, algorithms, models, databases, and/or the like stored in the memory of the controller.

The controller includes an available adhesion module 202, an effective adhesion module 204, a wheelslip margin/adhesion utilization module 205, a force on route module 206, a wheel size module 208, a movement constraints and commands module 210, and a torque assignment module 212. The available adhesion module obtains respective available adhesion values for the wheels at the interfaces between the wheels and the route segment. Each available adhesion value represents a theoretical tractive limit between the corresponding wheel and the route segment. The adhesion values described herein can represent coefficients of friction or other numerical indicators of friction. For example, the adhesion values can be expressed as quantitative proper fractions between 0 and 1, such as 0.4, 0.45, 0.5, and the like. The controller may obtain the available adhesion values for the multiple wheels by estimating, calculating, measuring, and/or receiving the values.

In an embodiment, the controller obtains the available adhesion value for each corresponding wheel by estimating the available adhesion value based on various factors. The factors may be parameters that are input into a friction model that is stored in the memory. The friction model may be generated based on historical data and/or lab testing. One example factor is a position of the wheel along a length of the vehicle. For example, inherent creep by leading wheels cleans the route and improves the adhesion for following wheels of the same vehicle. Creep refers to a distortion property of the wheel and the route at the wheel-route interface (or contact area). Creep is local slipping that is inherent when a vehicle accelerates. Based on the accumulated effect of creep, the adhesion values for the wheels may increase gradually from the front of the vehicle to the rear. The controller factors the position of the wheel or wheelset because a first wheel that is disposed in front of a second wheel along the length of the vehicle (in the direction of travel of the vehicle) is estimated to have less available adhesion than the trailing second wheel.

Another factor used to estimate the available adhesion value of each corresponding wheel is characteristics of the wheel. The characteristics of the wheel can include the material properties of the wheel and the condition of the wheel, such as age and health of the wheel. Characteristics of the route segment represent additional factors used to estimate the available adhesion values. The route segment characteristics can include geometric and/or geographic properties, such as a curvature of the route segment and/or a grade of the route segment (with respect to the direction of travel). The curvature can affect the location and the area of the contact patch of the wheel that engages the route segment. For example, a portion of the wheel in contact with the route along a linear route segment may differ from the portion of the wheel that contacts the route along a curve or turn. The route segment characteristics also include a material condition of the route segment, such as the material properties, age, and health of the route.

The route segment characteristics used to estimate the available adhesion values also include the operation, if at all, of the route friction modifying devices as the vehicle travels along the route segment. For example, the controller considers whether either of the air jet cleaning device or the friction-enhancing applicator device are operating (or will be operating during upcoming travel) to increase the friction along the route segment. As stated above, the vehicle may utilize various combinations of route friction modifying devices depending on different application-specific considerations, such as required or desired adhesion as the vehicle traverses a designated region. For example, if the vehicle is behind schedule, is approaching an incline grade, and/or the route segment is covered in precipitation, the controller may use the air jet to remove precipitation and debris from the route and may use the friction-enhancing applicator device to release sand on the route segment to increase the adhesion. Optionally, if the vehicle is on schedule, is traversing a flat area, and/or the route segment is relatively clear of precipitation and debris, the controller may deactivate the route friction modifying devices or retain the route friction modifying devices in the off state to conserve energy, sand, and/or the like, because the available adhesion is sufficient to enable desired vehicle movement. The controller can factor whether the route segment is covered in debris (including precipitation) and whether each of the route friction modifying devices is active or not in the estimation of the available adhesion values.

The controller (e.g., the friction model) can utilize a baseline adhesion value and adjust the baseline adhesion value for each respective wheel based on the various factors described above. In one example, an estimated baseline adhesion value at the lead wheelset (e.g., the front wheels connected via an axle) is 0.2, and the presence of creep rail cleaning, air jet cleaning, and sand can increase that baseline by respective constants or multipliers. In the above example, the presence of all three factors can result in an adjusted available adhesion value for the wheels of the front wheelset of 0.28. Due to the inherent improved friction of trailing wheels over leading wheels, the wheelset immediately following the lead wheelset is expected to have an available adhesion value greater than the estimated 0.28 of the lead wheelset. For example, the friction model can estimate the adhesion value for the first trailing wheelset as 0.33. Based on the factors described above, the friction model can be used to estimate a respective available adhesion value for each of the powered wheels of the vehicle. The powered wheels are the wheels that are coupled to corresponding traction motors and configured to receive torque from the corresponding traction motors to propel the vehicle.

After obtaining the available adhesion values for the wheels, the controller utilizes the available adhesion values for controlling the torque exerted on the wheels. For example, the controller may assign torque settings to the wheels in an effort to avoid demanding more adhesion than the respective amount of adhesion that is available. Exceeding the available adhesion can cause unintended wheel slip. The effective adhesion module determines respective effective adhesion values to utilize for driving rotation of the wheels. The effective adhesion values are based on the available adhesion values and a designated wheelslip margin and/or adhesion utilization. For example, for each respective wheel, the controller can determine the effective adhesion value by reducing the available adhesion value for that wheel based on the wheelslip margin and/or the adhesion utilization. The effective adhesion value represents the amount of adhesion or friction that is asked or demanded of the respective wheel at the wheel-route interface. The effective adhesion value may be less than the available adhesion value to prohibit unintentional wheel slipping. The effective adhesion value can also be referred to as a commanded, realized, experienced, or actual adhesion value.

The wheelslip margin is a predetermined, selected, or calculated set margin below the available adhesion value. The effective adhesion value can be determined to be within the wheelslip margin of the available adhesion value without exceeding the available adhesion value. The margin can be a percentage of the available adhesion. For example, the wheelslip margin can be represented by the Formula (1):

$$\text{Wheelslip Margin} = \frac{\text{Available} - \text{Effective}}{\text{Available}} \qquad (1)$$

In one example, the margin can be designated as 20%, such that the effective adhesion values are limited to values that are within 20% of the available adhesion values without exceeding the available adhesion values. The wheelslip margin is a constraint, such that the effective adhesion values are determined to enforce the wheelslip margin. The wheelslip margin can be determined based on application-specific considerations. For example, a smaller margin can result in improved performance of the vehicle (e.g., greater speeds and acceleration) relative to a larger margin because the adhesion demanded of the wheels can be closer to the available adhesion values, but the smaller margin can have a greater risk of unintentional wheel slip than a larger margin.

In an embodiment, the controller may selectively enforce the wheelslip margin depending on the situation and circumstances. For example, the controller may enforce the designated wheelslip margin only at vehicle speeds within a designated speed range. The designated speed range may be a low speed range. The low speed range can include any movement no greater than a threshold speed. The threshold speed can be predetermined based on application-specific considerations. In an example, the threshold speed can be 40 mph, and the designated speed range includes all non-zero speeds that are less than or equal to 40 mph. When the vehicle is accelerating from stop, the controller assigns torque settings to the individual wheels or wheelsets based at least in part on enforcing (e.g., not exceeding) the designated wheelslip margin. Once the vehicle exceeds the threshold speed, such as 40 mph in the hypothetical example above, the controller can assign torque settings to the individual wheels or wheelsets without being constrained by the designated wheelslip margin. For example, one or more of the torque settings assigned to the wheels or wheelsets at speeds above the designated speed range may command an adhesion value that is outside of the designated wheelslip margin.

In another example, the controller may enforce the designated wheelslip margin only at a designated range of tractive settings. The designated range of tractive settings can be a high setting range, such as all tractive settings above a designated threshold setting. In one example, the threshold setting can be notch six, such that the tractive setting range includes all notch calls greater than or equal to six. When the vehicle is commanded by an operator input, robot, trip plan, or the like, to provide a tractive setting within the designated range, the controller assigns torque settings to the individual wheels or wheelsets based at least in part on enforcing the designated wheelslip margin. For tractive settings outside of the designated range, such as notch calls below the threshold setting, the controller can assign torque settings without being constrained by the wheelslip margin.

In another example, the controller may enforce the designated wheelslip margin on only a subset of the wheels and/or wheelsets during a given time period, such that the designated wheelslip margin is not enforced on at least one of the wheels and/or wheelsets during the given time period. The selection of which wheels and/or wheelsets to include in the subset that enforces the wheelslip margin could be based on capability, adhesion, weight, and/or the like. The controller may alter which wheels and/or wheelsets represent the subset that enforces the wheelslip margin over time such that the makeup of the subset changes.

The adhesion utilization refers to the percentage of available adhesion that is used by each corresponding wheel. For example, the adhesion utilization can be a fraction or percentage represented by the Formula (2):

$$\text{Adhesion Utilization} = \frac{\text{Effective}}{\text{Available}} \qquad (2)$$

Optionally, the controller may designate the adhesion utilization for one or more of the wheels. For example, the controller may designate the same adhesion utilization for multiple different wheelsets of the vehicle. Assigning torque to the wheels based on a common adhesion utilization essentially asks each of the wheels to utilize the same percentage of capable adhesion, although the available adhesion values differ and the resulting tractive efforts exerted on the route segment will differ. In one example in which the adhesion utilization is designated as 95%, the controller can calculate the effective adhesion value for each of the corresponding wheels to be 95% of the respective available adhesion value. In an embodiment in which the adhesion utilization is not designated, the controller can determine the effective adhesion values within the range provided in the wheelslip margin.

The force on route module determines respective forces exerted on the route segment by the wheels of the vehicle. The force exerted on the route can represent an amount of weight that is applied on the route by the corresponding wheel or wheelset. The amount of weight can be a proportion of the total weight of the vehicle. The controller can determine the respective force (e.g., weight) exerted by each respective wheel or wheelset based on: (i) a static weight of the vehicle; (ii) a weight of cargo loaded onto the vehicle, (iii) a load being pulled by the vehicle, (iv) a fuel level of the vehicle, (v) a position of the wheel along a length of the vehicle, (vi) movement characteristics of the vehicle, (vii) wheel sizes, and/or (viii) a presence of dynamic weight management actuator forces.

The static weight, cargo weight, fuel level, and position of the wheel can be used to determine how much of the total weight of the vehicle is applied on the route by each corresponding wheel. The static weights can be measured at a manufacturer, such as on a scale. The controller can also factor various dynamic factors that affect the force on the route. For example, movement characteristics of the vehicle and the load being pulled by the vehicle can be used to determine a weight shift that dynamically affects the weight distribution. The weight shift is affected by drawbar forces. As the vehicle pulls a load, the dynamic weight shifts towards the back of the vehicle such that the weight on the rear wheelset increases and the weight on the front wheelset decreases relative to the static weight distribution. The movement characteristics can represent the vehicle speed, acceleration, deceleration, throttle settings, brake settings, a bounce effect from the suspension, and/or the like. Dynamic weight shifts can be determined in part based on force sensors onboard the vehicle, such as potentiometers, piezoresistive pressure sensors, and/or the like, which can represent one or more of the sensors 128 shown in FIG. 1.

The weight can also be affected by lateral forces, such as lateral forces as the vehicle traverses a curve or turns. Optionally, the vehicle may include dynamic weight management actuators within the suspension that can be controlled to exert varying amounts of force on different axles. The operation of the actuators affects the dynamic weights of the different wheelsets. Dynamic weight management is further described in U.S. Pat. Nos. 8,371,233 and 8,677,909, which are both incorporated by reference herein in their entirety.

The controller can use the effective adhesion values and the forces exerted on the route to calculate adhesion-limited tractive efforts according to Formula (3):

$$\text{Force} = \text{friction coefficient} * \text{weight} \qquad (3)$$

The controller can input the respective effective adhesion value for each corresponding wheel as the friction coefficient and the respective force on the route exerted by the corresponding wheel as the weight. The adhesion-limited tractive effort can represent the amount of tractive effort that the wheel is controlled to exert on the route segment. Because the adhesion-limited tractive efforts incorporate the wheelslip margin and/or adhesion utilization that provide a buffer below the available adhesion, the wheels are expected to be able to provide the respective adhesion-limited tractive efforts without experiencing wheel slip.

FIG. 3 is a table 300 illustrating operations of the controller for assigning torque to three wheels of a vehicle according to one example. The wheels are spaced apart along a length of the vehicle, such that the wheels are components of different wheelsets. In one example, the first wheel (e.g., wheel 1 in the table) can represent the lead wheel 106A of the vehicle in FIG. 1, the second wheel (e.g., wheel 2) can represent the third wheel 106B in FIG. 1, and the third wheel (e.g., wheel 3) can represent the rear wheel 106C in FIG. 1. The table includes a position column 302, an available adhesion column 304, a designated adhesion utilization column 306, an effective adhesion column 308, a weight column 310, and an adhesion-limited tractive effort (TE) column 312. The position column indicates that the first wheel is at the front of the vehicle, the second wheel is at a middle of the vehicle along the length, and the third wheel is at the rear of the vehicle. The front, middle, and rear may be relative designations, such that the second wheel is between the first and third wheels, without necessarily representing a middle wheelset of the vehicle.

The data in the available adhesion column can be determined by the controller based on the factors described with reference to the available adhesion module in FIG. 2. The table indicates that the respective available adhesion values of the first, second, and third wheels are 0.30, 0.34, and 0.40, respectively. The designated adhesion utilization in the table is 95%. The three wheels are controlled according to the same adhesion value. Multiplying the available adhesion values by the 0.95 adhesion utilization provides effective adhesion values of 0.28 for the first wheel, 0.32 for the second wheel, and 0.38 for the third wheel. The controller separately determines the weights exerted by the wheels based on the description of the force on route module in FIG. 2. The weights exerted by the first, second, and third wheels on the route segment are 68,000 lbs., 70,000 lbs., and 73,000 lbs., respectively. The controller multiplies the respective weight times the respective effective adhesion value for each wheel to calculate the adhesion-limited tractive effort values according to Formula (3). The table indicates that the adhesion-limited tractive efforts of the first, second, and third wheels are 19,040 N, 22,400 N, and 27,740 N, respectively.

The variance in the adhesion-limited tractive efforts indicates that the wheels can provide different amounts of tractive force before experiencing wheel slip. The third or rear-most wheel of the group can provide the most tractive force relative to the other two wheels, and the first or front-most wheel can provide the least tractive force. The adhesion-limited tractive efforts shown in the table can be utilized as upper limits by the controller when distributing tractive effort among the wheels of the vehicle. For example, according to the illustrated table, the controller can command each of the wheels to provide 19,000 N of force without risk of wheel slip, for a total output of 57,000 N. The controller can also command the first wheel to provide 19,000 N, the second wheel to provide 22,000 N, and the third wheel to provide 27,000 N, for an increased total output of 68,000 N, without increasing the risk of wheel slip.

In an embodiment, the controller may utilize relative available adhesion values such that the available adhesion value for one wheel or wheelset is determined based on the available adhesion value for another wheel or wheelset. For example, the controller may estimate the available adhesion for the front wheel or wheelset of the vehicle, and then estimate the available adhesion for at least one trailing wheel or wheelset based on that estimated available adhesion. The controller can estimate that the second wheel or wheelset immediately following the front wheel or wheelset has a set percentage more adhesion available. For example, if the estimated available adhesion for the front wheel is 0.30, as shown in FIG. 3, and the set percentage increase for the second wheel over the front wheel is 10%, then the controller calculates that available adhesion for the second wheel to be 0.33 (e.g., 0.30*110%). The set percentages for the difference wheels or wheelsets relative to the reference wheel or wheelset can be based on the relative positioning of the wheels or wheelsets along the length of the vehicle, the presence of friction-modification applications along the route, historical data of previous adhesion measurements, and/or the like. For example, the controller may use a set percentage increase of 30% for a third wheel that is rearward of the second wheel, resulting in a calculated available adhesion value of 0.39 (e.g., 0.30*130%). Estimating the available adhesion value for one or more of the wheels or wheelsets as a relative value based on another wheel or wheelset can be useful if an absolute value of the available adhesion for a given wheel or wheelset cannot be estimated according to the friction model described above.

Referring back to FIG. 2, the torque assignment module receives the determined forces on the route (e.g., weights) and the effective adhesion values and determines respective adhesion-limited tractive efforts for the wheels of the vehicle based on the forces on the route and the effective adhesion values. The torque assignment module uses the adhesion-limited tractive efforts to determine the allocation of torque among the wheels for propelling vehicle along the route segment.

In an embodiment, the adhesion-limited tractive efforts may be utilized as limits or constraints. The torque assignment module may receive additional commands and constraints for controlling the vehicle from the movement constraints and commands module. For example, the constraints may include a trip schedule (e.g., departure time and location, arrival time and location, etc.), equipment limitations, and regulations, such as speed limits. The commands can include tractive and brake settings, such as notch settings, cruising speeds, and/or total desired tractive effort, which may vary based on a location of the vehicle along a route. The commands may be designated by an operator using the I/O device, may be received from a remote source via the communication device, or may be supplied by a trip plan stored in the memory.

In one example with additional reference to FIG. 3, the controller can receive a command for the group of three wheels or wheelsets of the vehicle to provide a total tractive effort of 60,000 N for a given time period. The controller (e.g., the torque assignment module thereof) can allocate power in the form of torque among the first, second, and third wheels or wheelsets in FIG. 3 to meet the commanded tractive output without exceeding the respective adhesion-limited tractive efforts of the individual wheels. For example, the controller may allocate the first wheel to provide 18,000 N, the second wheel to provide 21,000 N, and the third wheel to provide 21,000 N, which in aggregate is 60,000 N. The distribution does not exceed any of the adhesion-limited tractive efforts of 19,040 N, 22,400 N, and 27,740 N, respectively, so each of the wheels is expected to be able to provide the designated tractive forces without slipping.

Known control systems that distribute tractive efforts without factoring available adhesion at each wheel-route interface may assign each of the wheels to provide the same amount of tractive effort. In the above example in which 60,000 N is commanded, each of the three wheels may be allocated to provide 20,000 N. However, 20,000 N exceeds the adhesion-limited tractive effort of the first wheel, which is 19,040 N in FIG. 3, so the first wheel may experience wheel slip during operation. The wheel slip causes the first wheel to provide reduced tractive effort, such that the effort gets redistributed among the remaining wheels. Furthermore, the wheel slip may degrade the first wheel and/or the route and may cause vibration in the vehicle. The vehicle control system disclosed herein is able to factor the adhesion capabilities of the individual wheels and wheelsets into the distribution of power among the wheels, which can reduce the occurrence of unintentional wheel slips relative to the known control systems.

The vehicle control system disclosed herein may also provide increased performance of the vehicle relative to known control systems that do not factor individual wheel adhesion capabilities. For example, during an acceleration period or a period where an incline grade is encountered, the controller may receive a command for maximum tractive effort. In response, the controller may assign torque settings to cause each of the wheels to provide the respective adhesion-limited tractive effort. In the illustrated embodiment, the three wheels provide 19,040 N, 22,400 N, and 27,740 N, respectively, for a total tractive effort of 69,180 N. Because the calculated adhesion-limited tractive efforts already account for the adhesion capabilities of the wheels, the three wheels are expected to be able to provide the 69,180 N without risk of any of the wheels slipping. Known control systems, on the other hand, may compensate for the risk of wheel slip by incorporating a generous margin. For example, the known control systems may assume that slipping can occur at 20,000 N, so may implement a margin of 2,000 N to conservatively limit the maximum tractive effort of each wheel or wheelset to 18,000 N (e.g., expected slip threshold minus margin). In this scenario, if all three wheels are controlled to provide 18,000 N, the aggregate tractive effort is only 54,000 N, which is over 15,000 N less than the effort supplied by the vehicle control system disclosed herein. The embodiments of the vehicle control system are able to provide more aggressive control of the vehicle than the known control systems without increasing the risk of wheel slips. For example, by performing a more accurate and detailed analysis of individual wheel adhesion capabilities, the vehicle control system can avoid the use of conservative margins or buffers that unduly limit the tractive effort asked of the wheels.

In an embodiment, the controller (e.g., the torque assignment module) implemented the distribution of tractive effort among the wheels and wheelsets by converting tractive effort to torque. The tractive force can be converted to torque according to Formula (4):

$$\tau = \frac{f}{d} \tag{4}$$

wherein $\tau$ represents torque, f represents tractive force, and d represents the distance from the torque application to the wheel-route interface, which is the radius of the wheel. In FIG. 2, the wheel size module determines a respective size dimension of each of the wheels. The size dimension can be a radius or diameter of the wheel. The wheel size is then input into Formula 4 with the allocated tractive effort for the corresponding wheel to calculate the torque.

Optionally, the wheel size can be obtained based on linear measurement or manufacturer specifications, such as an 18-inch diameter wheel, and used as a constant for all corresponding wheels. Alternatively, the controller can calculate the respective wheel sizes for at least some of the wheels. The wheel sizes can be determined by comparing the wheel speeds (e.g., angular rotation of the wheels) relative to the linear speed of the vehicle. One method for determining the diameter of a wheel in a vehicle based on movement of the vehicle is disclosed in U.S. Pat. No. 6,148,269, which is incorporated by reference herein in its entirety.

Upon determining the torque, the controller assigns respective torque settings to associated propulsion components for rotating the corresponding wheels of the vehicle. For example, the controller can generate a first signal that is conveyed to a traction motor mechanically coupled to a first wheel of the vehicle and a second signal that is conveyed to a different traction motor mechanically coupled to a second wheel of the vehicle. The first and second signals may represent or indicate different torque settings. The traction motors may exert torque on the associated wheels based on the torque settings received, such that some traction motors may exert more torque than other traction motors.

In one or more embodiments, instead of or in addition to estimating the available adhesion values of the wheels, at least some of the available adhesion values can be actual adhesion values that are measured during travel of the vehicle. In an embodiment, during travel of the vehicle along the route, the vehicle control system may periodically update the available adhesion values of the wheels by challenging one or more of the wheels until slip occurs. For example, the controller may control the propulsion subsystem to gradually increase the torque exerted on one wheel (e.g., a first wheel) above the assigned torque setting for that wheel. As a result, instead of providing, for example, 20,000 N of tractive effort, the wheel receives a gradually-increasing amount of torque and provides in excess of 20,000 N. As the first wheel is challenged, the other wheels may continue to receive the assigned amounts of torque. Eventually, sensors onboard the vehicle, such as wheel speed sensors, determine that the first wheel is slipping. Based on the time that the first wheel initially slips and the gradually increasing torque settings, the controller determines the torque threshold above which the first wheel slips. The torque threshold can be input into Formula 4 above to update the adhesion-limited tractive effort for the first wheel. The updated adhesion-limited tractive effort can be used to update the available adhesion value for the first wheel using Formulas 2 and 3, for example. The updated available adhesion value may be more accurate than the initial available adhesion value because the updated value is based on actual wheel slipping as the vehicle travels and the initial value is based on estimates using a friction model.

In an embodiment, the vehicle control system can iteratively challenge the different wheels or wheelsets one at a time during different time periods of a trip to sequentially update the available adhesion values for each of the wheels. For example, the vehicle control system can cause the first wheel to slip during a first time period, can cause a second wheel to slip during a discrete second time period, and can cause a third wheel to slip during a discrete third time period. The vehicle control system can also cycle through the wheels or wheelsets multiple times such that the same wheel can be caused to slip multiple times over the course of a trip. The updated available adhesion values are utilized by the controller to adjust the torque settings that are assigned for rotating the wheels as the vehicle travels. The intentional wheel slips may be controlled to have very limited durations such that little degradation of the wheels and route occur and little vibration is caused. Alternatively, instead of sequentially challenging the wheels or wheelsets one at a time, the challenge can be concurrently performed on multiple wheels or wheelsets at the same time.

In another example, the controller may utilize actual adhesion values achieved in the past as the available adhesion values for assigning torque to the wheels and/or wheelsets. The past adhesion values may be recently obtained during the current trip of the vehicle or may be more distant in time, such as from previous trips of the vehicle. The past adhesion values may be determined based on the measured torque and/or tractive force during actual wheel slip events that occurred in the past.

In an embodiment, the vehicle control system is disposed onboard the vehicle as shown in FIG. 1. For example, the controller with the one or more processors that obtain the available adhesion values and assign the torque settings are located on the vehicle. In an alternative embodiment, the vehicle control system may be located at least partially offboard. For example, the controller with the one or more processors may be located at a dispatch facility that is remote from the vehicle. The off-board controller may communicate with the vehicle via the onboard communication device. For example, upon determining the torque settings for a given vehicle, the controller at a dispatch facility or other remote location may generate a message that contains the torque settings. The message is wirelessly communicated and received by the onboard communication device, which can forward the message to the onboard vehicle control unit. The vehicle control unit can implement the commanded torque settings in the message by controlling the propulsion equipment of the propulsion subsystem.

FIG. 4 is a flow chart 400 of a method for controlling movement of a vehicle system along a route segment according to an embodiment. The method may be performed by the vehicle control system described above with reference to FIGS. 1-3. The method optionally includes additional steps than shown, fewer steps than shown, and/or different steps than shown. At 402, a respective force exerted on a route segment by each of one or more wheels of a plurality of wheels of a vehicle is determined. In an embodiment, the one or more wheels represents multiple wheels of the vehicle, such that a separate determination of the force exerted on the route is made for each of the wheels. The following description relates to a first wheel and a second wheel, although the same processes can be performed on more than two wheels. In an alternative embodiment, the method can be performed based on only a single wheel or wheelset, such as if only one wheel or wheelset is powered to provide tractive effort on the route. The respective force exerted by each wheel on the route segment can be determined based on: (i) a static weight of the vehicle; (ii) a weight of cargo loaded onto the vehicle, (iii) a load being pulled by the vehicle, (iv) a fuel level of the vehicle, (v) a position of the wheel along a length of the vehicle, (vi) movement characteristics of the vehicle, and/or (vii) a presence of dynamic weight management actuator forces.

At 404, a respective available adhesion value for each of the wheels at an interface with the route segment is obtained. For each wheel, the available adhesion value can be obtained by estimating the available adhesion value based at least in part on characteristics of the route segment. The characteristics of the route segment can include: (i) a curvature of the route segment, (ii) a grade of the route segment, (iii) a presence of an applied friction-enhancing material on the route segment, (iv) a presence of air jet cleaning of the route segment, (v) a presence of precipitation on the route segment, (vi) a presence of debris on the route segment, and/or (vii) a material condition of the route segment. The available adhesion value can be generated by inputting various data parameters into a friction model.

At 406, a respective effective adhesion value to utilize for driving rotation of each of the wheels is determined. The effective adhesion value is based on the available adhesion value and a designated wheelslip margin. For example, the effective adhesion value can be constrained within the designated wheelslip margin relative to the available adhesion value without exceeding the available adhesion value. The first and second wheels can have different available adhesion values, and therefore different effective adhesion values within the wheelslip margin. In an embodiment, the respective effective adhesion values for the first and second wheels are determined in order for the first and second wheels to provide the same adhesion utilization. The adhesion utilization represents the effective adhesion value over the available adhesion value. The adhesion utilization can be designated or selected. Designating the adhesion utilization and/or wheelslip margin are configured to ensure that the tractive effort that is demanded or asked of each wheel does not exceed the capability of that wheel, such that the wheel unintentionally slips. In one example, the adhesion utilization can be designated as 80%, 85%, 90%, 95%, or the like, including intervening values between the explicitly-mentioned values. The adhesion utilization and/or wheelslip margin can be selected based on application-specific considerations.

At 408, a respective torque setting is assigned to rotate each of the wheels. The torque settings are assigned based at least in part on the respective forces exerted on the route segment by the wheels and the effective adhesion values for the wheels. The torque settings may also be assigned based on a total tractive effort that is desired. In an embodiment, the torque settings are assigned by converting tractive effort to torque using a respective size (e.g., radius and/or diameter) of the wheel.

At 410, the torque settings for the wheels are communicated to a propulsion subsystem of the vehicle for driving rotation of the corresponding wheels according to the torque settings during a propulsion mode and/or a braking mode of the vehicle. The propulsion subsystem can include traction motors and associated equipment and circuitry. The vehicle moves along the route segment based on the rotation of the wheels controlled according to the torque settings.

At 412, a determination is made whether to update the torque settings during movement of the vehicle. If it is determined not to update, then the method ends. If, on the other hand, an update is desired, then flow proceeds to 414. At 414, the torque exerted on one of the wheels (e.g., the first wheel) is gradually increased, above and beyond the assigned torque setting, during travel of the vehicle along the route segment. The torque is gradually increased until the wheel experiences wheel slip.

At 416, the wheel slip event of the first wheel is used to determine a torque threshold above which the first wheel slips. Upon determining the torque threshold, the method returns to 404 and the available adhesion value for the first wheel is updated based at least in part on the determined torque threshold. The method continues as described above and the torque setting that is assigned for rotating the first wheel is adjusted based on the updated available adhesion value. The first wheel is then controlled to rotate based on the updated torque setting. Upon reaching 412 again, the process may proceed to 414 and gradually increase the torque exerted on another wheel (e.g., the second wheel). Thus, the process may iteratively repeat to determine torque thresholds for each of the one or more wheels.

One or more technical effects of the vehicle control system described herein include enhanced control over a vehicle by more accurately predicting torque settings that would cause individual wheels of the vehicle to slip. The slip prediction provide the technical effects of avoiding unintentional wheel slips and/or enabling more aggressive control of the vehicle without increasing the risk of unintentional wheel slips. For example, the vehicle control system can avoid conservative adhesion-limiting margins and control the individual wheels to utilize up to 99% of the available adhesion. The vehicle control system can achieve increased performance from the vehicle, such as increased acceleration, faster travel speed, shorter trip duration, increasing the amount of cargo or load conveyed by the vehicle, and/or requiring fewer or smaller propulsion-generating equipment relative to controlling the vehicle based on conservatively limited torque settings.

In one or more embodiments, a vehicle control system is provided that includes a controller comprising one or more processors. The controller is configured to determine a respective force exerted on a route segment by a first wheel of a plurality of wheels of a vehicle and obtain a respective available adhesion value for the first wheel at an interface with the route segment. The controller is configured to determine a respective effective adhesion value to utilize for driving rotation of the first wheel. The effective adhesion value is within a designated wheelslip margin relative to the available adhesion value for the first wheel without exceeding the available adhesion value. The controller is further configured to assign a torque setting to rotate the first wheel based at least in part on the respective force exerted on the route segment by the first wheel and the effective adhesion value for the first wheel.

Optionally, the controller is also configured to base the assignment of the torque setting on a diameter of the first wheel. Optionally, the controller is configured to assign the torque settings to enforce the designated wheelslip margin only at vehicle speeds within a designated speed range. Optionally, the vehicle control system further includes a propulsion subsystem of the vehicle. The propulsion subsystem is configured to receive the torque setting and drive rotation of the first wheel according to the torque setting during a propulsion mode and/or a braking mode of the vehicle. Optionally, the controller is disposed onboard the vehicle.

Optionally, the controller is configured to obtain the available adhesion value for the first wheel by estimating the available adhesion value based at least in part on: (i) a position of the first wheel along a length of the vehicle, (ii) characteristics of the route segment, and/or (iii) characteristics of the first wheel. Optionally, the characteristics of the route segment include: (i) a curvature of the route segment, (ii) a grade of the route segment, (iii) a presence of an applied friction-enhancing material on the route segment, (iv) a presence of air jet cleaning of the route segment, (v) a presence of precipitation on the route segment, (vi) a presence of debris on the route segment, and/or (vii) a material condition of the route segment.

Optionally, the controller is configured to control a propulsion subsystem of the vehicle to gradually increase a torque exerted to rotate the first wheel, above the assigned torque setting, during travel of the vehicle along the route segment until the first wheel experiences wheel slip to determine a torque threshold above which the first wheel slips. The controller is configured to update the available adhesion value for the first wheel based at least in part on the torque threshold that is determined and use the updated available adhesion value to adjust the torque setting that is assigned for rotating the first wheel during the travel of the vehicle.

Optionally, the respective force exerted by the first wheel on the route segment is determined based on: (i) a static weight of the vehicle; (ii) a weight of cargo loaded onto the vehicle, (iii) a load being pulled by the vehicle, (iv) a fuel level of the vehicle, (v) a position of the first wheel along a length of the vehicle, (vi) movement characteristics of the vehicle, and/or (vii) a presence of dynamic weight management actuator forces.

Optionally, the controller is configured to determine a respective force exerted on the route segment by a second wheel of the wheels of the vehicle and obtain a respective available adhesion value for the second wheel at an interface with the route segment. The second wheel is spaced apart from the first wheel along a length of the vehicle. The controller is configured to determine a respective effective adhesion value to utilize for driving rotation of the second wheel. The effective adhesion value is within the designated wheelslip margin relative to the available adhesion value for the second wheel without exceeding the available adhesion value. The effective adhesion value for the second wheel is different from the effective adhesion value for the first wheel. The controller is further configured to assign a torque setting to rotate the second wheel based at least in part on the respective force exerted on the route segment by the second wheel and the effective adhesion value for the second wheel. Optionally, the vehicle includes multiple wheelsets, and the first and second wheels are disposed on different wheelsets of the vehicle. Optionally, the controller determines the respective effective adhesion values for the first and second wheels in order for the first and second wheels to provide a same adhesion utilization. The adhesion utilization represents the effective adhesion value over the available adhesion value for each of the corresponding first and second wheels.

In one or more embodiments, a method (e.g., a vehicle control method) is provided that includes determining a respective force exerted on a route segment by a first wheel of a plurality of wheels of a vehicle and obtaining a respective available adhesion value for the first wheel at an interface with the route segment. The method also includes determining a respective effective adhesion value to utilize for driving rotation of the first wheel. The effective adhesion value that is determined is within a designated wheelslip margin relative to the available adhesion value for the first wheel without exceeding the available adhesion value. The method includes assigning a torque setting to rotate the first wheel based at least in part on the respective force exerted on the route segment by the first wheel and on the effective adhesion value for the first wheel.

Optionally, the assigning of the torque setting is also based on a diameter of the first wheel. Optionally, the method further includes communicating the torque setting to a propulsion subsystem of the vehicle for driving rotation of the first wheel according to the torque setting during a propulsion mode and/or a braking mode of the vehicle.

Optionally, obtaining the available adhesion value for the first wheel includes estimating the available adhesion value based at least in part on characteristics of the route segment. The characteristics of the route segment include: (i) a curvature of the route segment, (ii) a grade of the route segment, (iii) a presence of an applied friction-enhancing material on the route segment, (iv) a presence of air jet cleaning of the route segment, (v) a presence of precipitation on the route segment, (vi) a presence of debris on the route segment, and/or (vii) a material condition of the route segment. Optionally, the respective force exerted by the first wheel on the route segment is determined based on: (i) a static weight of the vehicle; (ii) a weight of cargo loaded onto the vehicle, (iii) a load being pulled by the vehicle, (iv) a fuel level of the vehicle, (v) a position of the first wheel along a length of the vehicle, (vi) movement characteristics of the vehicle, and/or (vii) a presence of dynamic weight management actuator forces.

Optionally, the method further includes gradually increasing a torque exerted to rotate the first wheel, above the assigned torque setting, during travel of the vehicle along the route segment until the first wheel experiences wheel slip to determine a torque threshold above which the first wheel slips. The method includes updating the available adhesion value for the first wheel based at least in part on the determined torque threshold, and adjusting the torque setting that is assigned for rotating the first wheel during the travel of the vehicle along the route segment based at least in part on the updated available adhesion value.

Optionally, the method further includes determining a respective force exerted on the route segment by a second wheel of the wheels of the vehicle. The second wheel is spaced apart from the first wheel along a length of the vehicle. The method includes obtaining a respective available adhesion value for the second wheel at an interface with the route segment, and determining a respective effective adhesion value to utilize for driving rotation of the second wheel. The effective adhesion value is within the designated wheelslip margin relative to the available adhesion value for the second wheel without exceeding the available adhesion value. The effective adhesion value for the second wheel is different from the effective adhesion value for the first wheel. The method also includes assigning a torque setting to rotate the second wheel based at least in part on the respective force exerted on the route segment by the second wheel and the effective adhesion value for the second wheel. Optionally, the respective effective adhesion values for the first and second wheels are determined in order for the first and second wheels to provide a same adhesion utilization. The adhesion utilization for each of the first and second wheels represents the respective effective adhesion value over the respective available adhesion value.

In one or more embodiments, a vehicle control system is provided that includes a controller comprising one or more processors. The controller is configured to determine a respective force exerted on a route segment by each of at least two wheels of a vehicle that are spaced apart along a length of the vehicle. The controller is configured to obtain a respective available adhesion value for each of the at least two wheels at an interface between the at least two wheels and the route segment. The controller is configured to determine a respective effective adhesion value to utilize for driving each of the at least two wheels. The effective adhesion values determined by the controller in order for each of the at least two wheels to provide a same adhesion utilization. The adhesion utilization represents the effective adhesion value over the available adhesion value for the corresponding wheel. The controller is further configured to assign a respective torque setting to rotate each of the at least two wheels based at least in part on the respective forces exerted on the route segment by the at least two wheels and the respective effective adhesion values for the at least two wheels.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle control system comprising:
   a controller comprising one or more processors, the controller configured to determine a respective force exerted on a route segment by a first wheel of a plurality of wheels of a vehicle and obtain a respective available adhesion value for the first wheel at an interface between the first wheel and the route segment, the controller configured to determine a respective effective adhesion value to utilize for driving rotation of the first wheel based on the available adhesion value for the first wheel such that the effective adhesion value is less than the available adhesion value,
   the controller further configured to assign a torque setting to rotate the first wheel based at least in part on the force exerted on the route segment by the first wheel and the effective adhesion value for the first wheel,
   wherein the controller is configured to obtain the available adhesion value for the first wheel by estimating the available adhesion value based at least in part on one or more of: (i) a position of the first wheel along a length of the vehicle, (ii) characteristics of the route segment, or (iii) characteristics of the first wheel.

2. The vehicle control system of claim 1, wherein the characteristics of the route segment include one or more of: (i) a curvature of the route segment, (ii) a grade of the route segment, (iii) a presence of an applied friction-enhancing material on the route segment, (iv) a presence of air jet cleaning of the route segment, (v) a presence of precipitation on the route segment, (vi) a presence of debris on the route segment, or (vii) a material condition of the route segment.

3. The vehicle control system of claim 1, wherein the controller is configured to control a propulsion subsystem of the vehicle to gradually increase a torque exerted to rotate the first wheel, above the assigned torque setting, during travel of the vehicle along the route segment until the first wheel experiences wheel slip to determine a torque threshold above which the first wheel slips, the controller configured to update the available adhesion value for the first wheel based at least in part on the torque threshold that is determined and use the updated available adhesion value to adjust the torque setting that is assigned for rotating the first wheel during the travel of the vehicle.

4. The vehicle control system of claim 1, wherein the controller is configured to determine the effective adhesion value for the first wheel by subtracting a designated margin from the available adhesion value for the first wheel.

5. A vehicle control system comprising:

a controller comprising one or more processors, the controller configured to determine a respective force exerted on a route segment by a first wheel of a plurality of wheels of a vehicle and obtain a respective available adhesion value for the first wheel at an interface between the first wheel and the route segment, the controller configured to determine a respective effective adhesion value to utilize for driving rotation of the first wheel based on the available adhesion value for the first wheel such that the effective adhesion value is less than the available adhesion value, the controller further configured to assign a torque setting to rotate the first wheel based at least in part on the force exerted on the route segment by the first wheel and the effective adhesion value for the first wheel, wherein the controller is configured to determine a respective second force exerted on the route segment by a second wheel of the wheels of the vehicle and obtain a respective second available adhesion value for the second wheel at a second interface between the second wheel and the route segment, the second wheel spaced apart from the first wheel along a length of the vehicle, the controller configured to determine a respective second effective adhesion value to utilize for driving rotation of the second wheel based on the second available adhesion value such that the second effective adhesion value is less than the second available adhesion value, the second effective adhesion value for the second wheel being different from the effective adhesion value for the first wheel, the controller further configured to assign a second torque setting to rotate the second wheel based at least in part on the second force exerted on the route segment by the second wheel and the second effective adhesion value for the second wheel.

6. The vehicle control system of claim 5, wherein the vehicle includes multiple wheelsets, and the first and second wheels are disposed on different wheelsets of the vehicle.

7. The vehicle control system of claim 5, wherein the controller is configured to determine the effective adhesion value for the first wheel and the second effective adhesion value for the second wheel such that a first adhesion utilization of the first wheel is the same as a second adhesion utilization of the second wheel, the first adhesion utilization representing the effective adhesion value for the first wheel over the available adhesion value for the first wheel, the second adhesion utilization representing the second effective adhesion value for the second wheel over the second available adhesion value for the second wheel.

8. A method comprising:

determining a respective force exerted on a route segment by a first wheel of a plurality of wheels of a vehicle;

obtaining a respective available adhesion value for the first wheel at an interface between the first wheel and the route segment;

determining a respective effective adhesion value to utilize for driving rotation of the first wheel based on the available adhesion value for the first wheel such that the effective adhesion value is less than the available adhesion value; and assigning a torque setting to rotate the first wheel based at least in part on the force exerted on the route segment by the first wheel and on the effective adhesion value for the first wheel, wherein obtaining the available adhesion value for the first wheel includes estimating the available adhesion value based at least in part on characteristics of the route segment, the characteristics of the route segment including one or more of: (i) a curvature of the route segment, (ii) a grade of the route segment, (iii) a presence of an applied friction-enhancing material on the route segment, (iv) a presence of air jet cleaning of the route segment, (v) a presence of precipitation on the route segment, (vi) a presence of debris on the route segment, or (vii) a material condition of the route segment.

9. The method of claim 8, further comprising gradually increasing a torque exerted to rotate the first wheel, above the assigned torque setting, during travel of the vehicle along the route segment until the first wheel experiences wheel slip to determine a torque threshold above which the first wheel slips;

updating the available adhesion value for the first wheel based at least in part on the determined torque threshold; and adjusting the torque setting that is assigned for rotating the first wheel during the travel of the vehicle along the route segment based at least in part on the updated available adhesion value.

10. The method of claim 8, further comprising:

determining a respective second force exerted on the route segment by a second wheel of the wheels of the vehicle, the second wheel spaced apart from the first wheel along a length of the vehicle;

obtaining a respective second available adhesion value for the second wheel at a second interface between the second wheel and the route segment;

determining a respective second effective adhesion value to utilize for driving rotation of the second wheel based on the second available adhesion value such that the second effective adhesion value is less than the second available adhesion value, wherein the second effective adhesion value for the second wheel is different from the effective adhesion value for the first wheel; and assigning a second torque setting to rotate the second wheel based at least in part on the second force exerted on the route segment by the second wheel and the second effective adhesion value for the second wheel.

11. The method of claim 10, wherein the effective adhesion value for the first wheel and the second effective adhesion value for the second wheel are determined such that a first adhesion utilization of the first wheel is the same as a second adhesion utilization of the second wheel, the first adhesion utilization representing the effective adhesion value for the first wheel over the available adhesion value for the first wheel, the second adhesion utilization representing the second effective adhesion value for the second wheel over the second available adhesion value for the second wheel.

<p style="text-align:center">* * * * *</p>